US010037556B2

(12) United States Patent
Raman et al.

(10) Patent No.: US 10,037,556 B2
(45) Date of Patent: Jul. 31, 2018

(54) DETERMINING AUTHENTICITY OF INFORMATION EMBEDDED IN A RESOURCE IDENTIFIER

(71) Applicant: Amazon Technologies, Inc., Seattle, WA (US)

(72) Inventors: Suri Raman, Mercer Island, WA (US); Aarti Bindlish, Bellevue, WA (US); Ernesto Gonzalez, Bellevue, WA (US); SaiPrasad Kapila, Redmond, WA (US); Antonio Melis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 745 days.

(21) Appl. No.: 14/498,855

(22) Filed: Sep. 26, 2014

(65) Prior Publication Data

US 2016/0092951 A1    Mar. 31, 2016

(51) Int. Cl.
*G06Q 30/06* (2012.01)
*H04L 9/00* (2006.01)

(52) U.S. Cl.
CPC ..... *G06Q 30/0609* (2013.01); *G06Q 30/0637* (2013.01); *G06Q 30/0641* (2013.01); *H04L 9/00* (2013.01)

(58) Field of Classification Search
CPC ... G06Q 30/0637; G06Q 30/0641; H04L 9/00
See application file for complete search history.

(56) References Cited

U.S. PATENT DOCUMENTS

| | | | | |
|---|---|---|---|---|
| 6,381,344 | B1* | 4/2002 | Smithies | G06K 9/00154 340/5.82 |
| 2002/0133412 | A1* | 9/2002 | Oliver | G06Q 30/02 705/26.35 |
| 2011/0307318 | A1* | 12/2011 | LaPorte | G06Q 20/209 705/14.33 |
| 2012/0290490 | A1* | 11/2012 | Young | G06Q 30/02 705/317 |
| 2013/0073452 | A1* | 3/2013 | Hodgetts | G06Q 30/04 705/39 |

(Continued)

OTHER PUBLICATIONS

"Tiwari et. al., A Multi-Factor Security Protocol for Wireless Payment-Secure Web Authentication Using Mobile Devices, 2011, Indian Institute of Information Technology" (Year: 2011).*

(Continued)

*Primary Examiner* — Michael Misiaszek
*Assistant Examiner* — Matthew W Todd
(74) *Attorney, Agent, or Firm* — Knobbe, Martens, Olson & Bear, LLP

(57) ABSTRACT

Systems and methods are provided for generating a uniform resource identifier ("URI") based on information relating to a transaction between two or more parties, and verifying the authenticity of the information embedded in the URI before generating a user interface to be displayed to one of the parties to the transaction. For example, the URI may include information relating to the terms of the transaction to which the parties have agreed. A system associated with a facilitator of the transaction may verify the authenticity of the terms embedded in the URI before dynamically generating a user interface that enables the transaction to proceed.

19 Claims, 7 Drawing Sheets

(56) References Cited

U.S. PATENT DOCUMENTS

2013/0290127 A1* 10/2013 Finseth .............. G06Q 30/0611
705/26.4

OTHER PUBLICATIONS

International Search Report and Written Opinion in corresponding PCT Application No. PCT/US15/51019, dated Dec. 28, 2015.
International Preliminary Report on Patentability in corresponding PCT Application No. PCT/US15/51019, dated Mar. 28, 2017.

* cited by examiner

DETERMINING AUTHENTICITY OF INFORMATION EMBEDDED IN A RESOURCE IDENTIFIER

BACKGROUND

Retailers and merchants involved in electronic commerce often provide user interfaces for users to receive information regarding items (e.g., products and/or services) available for purchase and/or allow a user to browse items included in an electronic catalog. The users can search or browse the electronic catalog for items that they want to purchase. The electronic catalog may provide various information regarding the items in the electronic catalog, such as the price, seller, available quantity, and available shipping methods. If the users find items that they like in the electronic catalog, they can proceed to order the items.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1A:
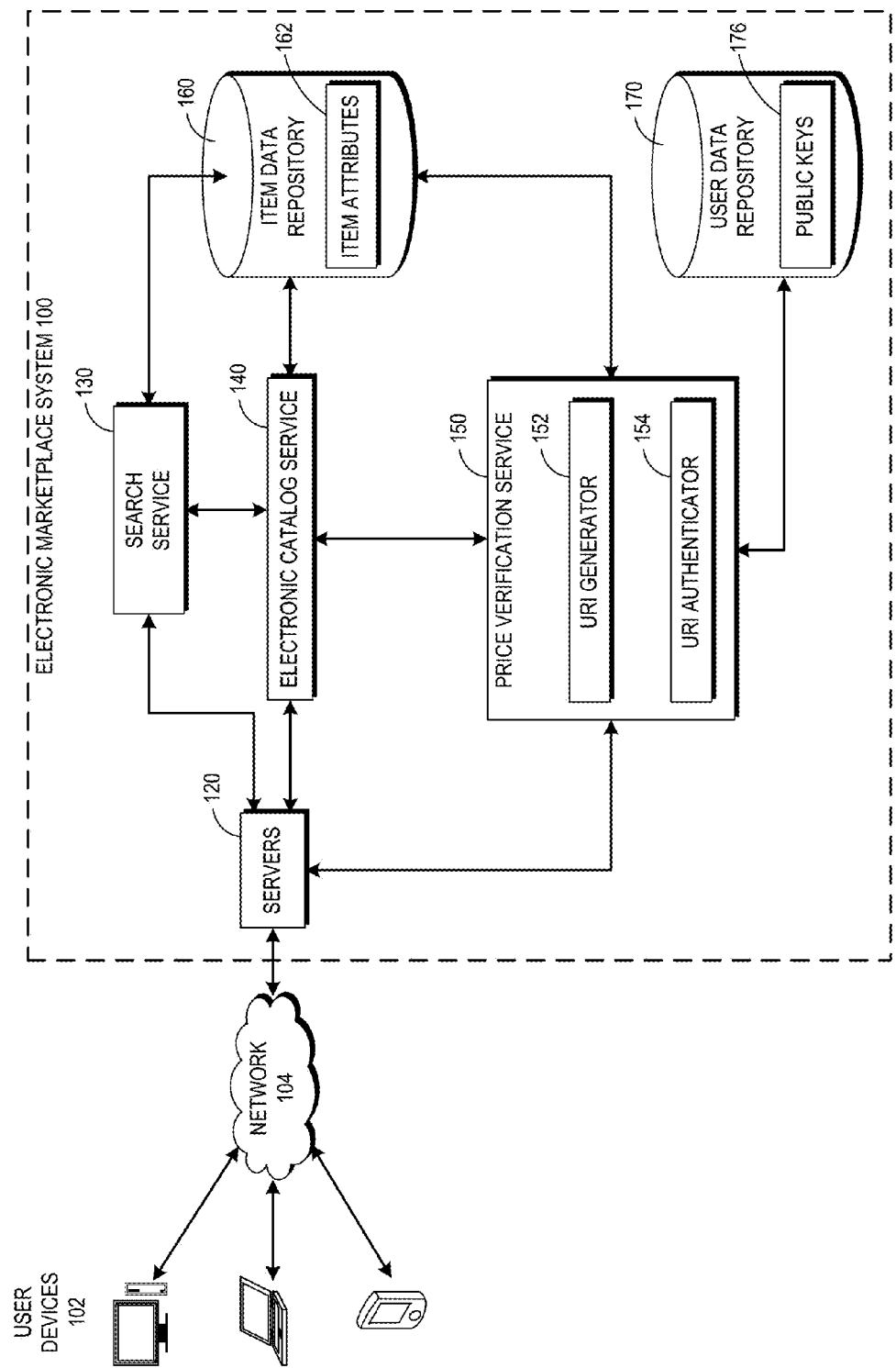
FIG. 1A is a block diagram depicting an illustrative operating environment for determining the authenticity of price information embedded in a uniform resource identifier.

In today's business world, price negotiations are commonplace among sellers and buyers, and are sometimes necessary in order to consummate business deals. Such negotiations are specific to the parties to the business transaction at hand, and a single seller may agree on different terms (e.g., the selling price) with different buyers. In such a case, the seller may have to keep track of the selling prices offered to different buyers so that each buyer can be provided with a private catalog with the correct prices listed thereon. However, as the volume of the seller's business grows, the amount of party-specific information that the seller needs to store and maintain also grows and can become cumbersome to the seller. Further, in some cases, the seller may wish to utilize a marketplace facilitator in order to facilitate the sale between the seller and the buyer. However, in such cases, the seller may have to reveal sensitive information (e.g., lowest price charged to any buyer) to the facilitator. Without such information, the facilitator has no way of knowing which buyer is entitled to buy at which price. Thus, an improved method of facilitating price negotiations while minimizing the need for storage and disclosure of buyer-specific information is desired.

According to aspects of the present disclosure, a uniform resource identifier ("URI") may be generated based on user-specific information and provided to the user. When the user subsequently wishes to proceed with the transaction, the authenticity of the information embedded in the URI is verified (e.g., by a facilitator service or system) before the transaction is completed. For example, in some embodiments, a system associated with the seller generates and provides a URI to its potential buyer, and the buyer uses the URI, with the help of the facilitator such as an electronic marketplace system, to complete the purchase. In some embodiments, all the user-specific information needed to verify the authenticity of the buyer-specific information is embedded in the URI, and thus, the need for the seller to disclose such information to the facilitator and the need for the facilitator to maintain such information can be eliminated, thereby satisfying sellers who would like to keep such information confidential, and at the same time, resulting in cost savings for the facilitators who would otherwise need to acquire and maintain storage space, which can be substantial depending on the volume of transactions they handle. As will be appreciated, the decreased storage requirements may be substantial with respect to facilitator and/or seller systems in which hundreds or thousands of user-specific price arrangements have been accepted by one or more sellers. Accordingly, aspects of the present disclosure may enable an agreed upon price between a seller and a buyer to be honored at a future time by an electronic catalog system with substantial storage efficiency relative to alternatives that may require storage of various terms of the agreement.

In some embodiments, an electronic catalog system, as described herein, may include or be in communication with an electronic data store that includes information regarding items that may be listed for sale, lease, etc. by sellers, merchants, and/or other users. The item information in this data store may be viewable by end users through a browsable or searchable electronic catalog in which each item may be described in association with a network page describing the item (which may be referred to herein as an item detail page). Each item detail page may include, for example, an item image and description, customer ratings, customer and professional reviews, sales rank data, lists of related items, and/or other types of supplemental data that may assist consumers in making informed purchase decisions. Users of the system may, in some embodiments, locate specific item detail pages within the electronic catalog by executing search queries, navigating a browse tree and/or using various other navigation techniques. As used herein, the term "item," in addition to having its ordinary meaning, is used interchangeably to refer to an item itself (e.g., a particular product or service) and to its description or representation in a computer system or electronic catalog. As will be apparent from the context in which it is used, the term is also sometimes used herein to refer only to the item itself or only to its representation in the computer system.

Some embodiments are described herein in the context of a retail environment. For example, aspects of the present disclosure, in some embodiments, may be used and/or implemented in the context of business to business (B2B), business to consumer (B2C), consumer to consumer (C2C), or any other marketplace that involves customer-specific pricing of items. However, it will be appreciated that the techniques described herein may be used for verifying information other than price information, and the techniques for verifying information embedded in a uniform resource identifier and generating a user interface based on the embedded information, as described herein, are not limited to the context of a retail environment and may be used in any other context in which such URI verification and UI generation may be desirable.

The illustrative operating environment shown in FIG. 1A includes an electronic marketplace system 100 that enables users to browse and place orders for items (such as items listed in an electronic catalog). The electronic marketplace system 100 may include a price verification service 150 that includes a URI generator 152 and a URI authenticator 154 stored in memory therein that may be used to implement various aspects of the present disclosure, such as generating a URI, verifying the information embedded in the URI, generating a user interface based on the information embedded in the URI, and other aspects discussed herein.

By way of illustration, various example user computing devices 102 are shown in communication with the electronic marketplace system 100, including a desktop computer, laptop, and a mobile phone. In general, the user computing devices 102 can be any computing device such as a desktop; laptop; mobile phone (or smartphone); tablet; kiosk; gaming console or controller; television; wristwatch (including a smartwatch); electronic book reader; wireless device; set-top box or other television box; media player; one or more processor devices; integrated circuit components for inclusion in computing devices, appliances, electronic devices for inclusion in vehicles, appliances, or machinery; etc.

The user computing devices 102 access the electronic marketplace system 100 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. Protocols and components for communicating via the Internet or any of the other aforementioned types of communication networks are well known to those skilled in the art and, thus, are not described in more detail herein.

The marketplace system 100 is depicted in FIG. 1A as operating in a distributed computing environment including several computer systems that are interconnected using one or more computer networks. The marketplace system 100 could also operate within a computing environment having a fewer or greater number of devices than are illustrated in FIG. 1A. Thus, the depiction of marketplace system 100 in FIG. 1A should be taken as illustrative and not limiting to the present disclosure. For example, the marketplace system 100 or various constituents thereof could implement various Web services components, hosted or "cloud" computing environments, and/or peer-to-peer network configurations to implement at least a portion of the processes described herein.

Further, the electronic marketplace system 100 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the depicted embodiment, the electronic marketplace system 100 includes servers 120, which can communicate with the user computing devices 102 over the network 104 and which can provide access to various services of the electronic marketplace system 100. In the illustrated embodiment, the services provided by the electronic marketplace system 100 include a search service 130, an electronic catalog service 140, and a price verification service 150. In some embodiments, these services can be implemented as software components executing in physical computer hardware on the servers 120 or in separate computing devices. Moreover, the processing of the various components or services of the electronic marketplace system 100 can be distributed across multiple machines, networks, or other computing resources. The various components or services of the electronic marketplace system 100 can also be implemented in one or more virtual machines or hosted computing environment (e.g., "cloud") resources, rather than in dedicated servers. Likewise, the data repositories shown can represent local and/or remote, physical and/or logical data storage, including, for example, storage area networks or other distributed storage systems. In some embodiments, the connections between the components or services shown represent possible paths of data flow, rather than actual connections between hardware. Executable code modules that implement various functionalities of the electronic marketplace system 100 can be stored in the memories of the servers 120 and/or on other types of non-transitory computer-readable storage media. While some examples of possible connections are shown, any subset of the components shown can communicate with any other subset of components in various implementations.

The search service 130 and the electronic catalog service 140 can provide users with access to an electronic catalog stored in an item data repository 160. The electronic catalog may include information regarding items that may be purchased, rented, or otherwise accessed by the users of the user computing devices 102. The information in the electronic catalog can be hierarchically organized according to categories, subcategories, and the like. The electronic catalog information contained in the item data repository 160 can include items other than products or services, such as blogs, periodicals, social networking profiles, or the like. In some embodiments, the item data repository 160 may store digital content items (e.g., audiobooks, electronic books, music, movies, multimedia works, or the like).

In the depicted embodiment, the item data repository 160 includes item attributes 162, which may include various attributes of the items in the electronic catalog. The attributes may include, but are not limited to, one or more of item ID, title, images, description, keywords, price, weight, volume, dimensions, type, vendor, availability, and the like.

The search service 130 and/or electronic catalog service 140 can provide users with access to the items in the electronic catalog by way of a network site, which may be a network resource such as a website or a mobile application. For example, the electronic catalog service 140 can generate network pages that include detailed information regarding particular items (e.g., item detail pages).

The price verification service 150 of the electronic marketplace system 100 may implement a price verification method by which user-specific information used to complete a business transaction may be included in a URI, thereby eliminating the need to store and maintain such user-specific information in a database accessible by other components of the marketplace system 100. In the depicted embodiment, the price verification service 150 includes a URI generator 152 and a URI authenticator 154. The URI generator 152 can generate a URI based on information of any user and/or item. In one embodiment, the URI generator 152 embeds various information including, but not limited to, one or more of item ID, seller ID, buyer ID, start date, end date, quantity limit, discount type, discount value, and/or other information. The URI authenticator 154 determines the authenticity of the information embedded in a URI. In some embodiments, the URI authenticator 154 decrypts the URI (or a portion thereof) and extracts the information embedded therein. The techniques for generating and authenticating a URI and verifying the authenticity of the information embedded therein are described in greater detail below with reference to FIGS. 2 and 3.

The price verification service 150 may be connected to and/or in communication with a user data repository 170 that stores data related to users of the electronic marketplace system 100. For example, user data stored in the user data repository 170 may include, but is not limited to, user ID, login credentials, membership type, purchase history, browsing history, search history, and/or other information. As shown in FIG. 1A, the user data repository 170 may store one or more public keys 176 that may be used to decrypt uniform resource identifiers (or portions thereof), according to aspects of the present disclosure. For example, user data repository 170 may store information regarding the users (e.g., sellers, buyers, and the like) of the electronic marketplace system 100 and one or more public keys associated the users. The techniques for encrypting and decrypting the URIs and/or the information embedded therein are described in greater detail below with reference to FIGS. 2 and 3.

In some embodiments, the user data repository 170 may be local to the price verification service 150, may be remote from the price verification service 150, and/or may be a network-based service itself. The item data repository 160 and/or user data repository 170 may be embodied in hard disk drives, solid state memories, and/or in any other type of non-transitory computer-readable storage medium, and/or may be stored as a file, a database, a relational database, and/or in-memory cache, in any such non-transitory computer-readable medium accessible to the retail servers 120. The item data repository 160 and/or user data repository 170 may also be distributed or partitioned across multiple local and/or remote storage devices without departing from the spirit and scope of the present disclosure.

In some embodiments, the electronic marketplace system 100 may include other components not illustrated in FIG. 1A. For example, the electronic marketplace system 100 may include an offer service configured to provide price information to one or more other components of the electronic marketplace system 100. The price information may indicate the price at which various items are to be sold, and may be based on various data supplied by sellers and/or may be dynamically determined based on a variety of factors. In another example, the electronic marketplace system 100 may include a cost system for identifying the discounted prices that various sellers are willing to offer to their customers.

Figure 1B:
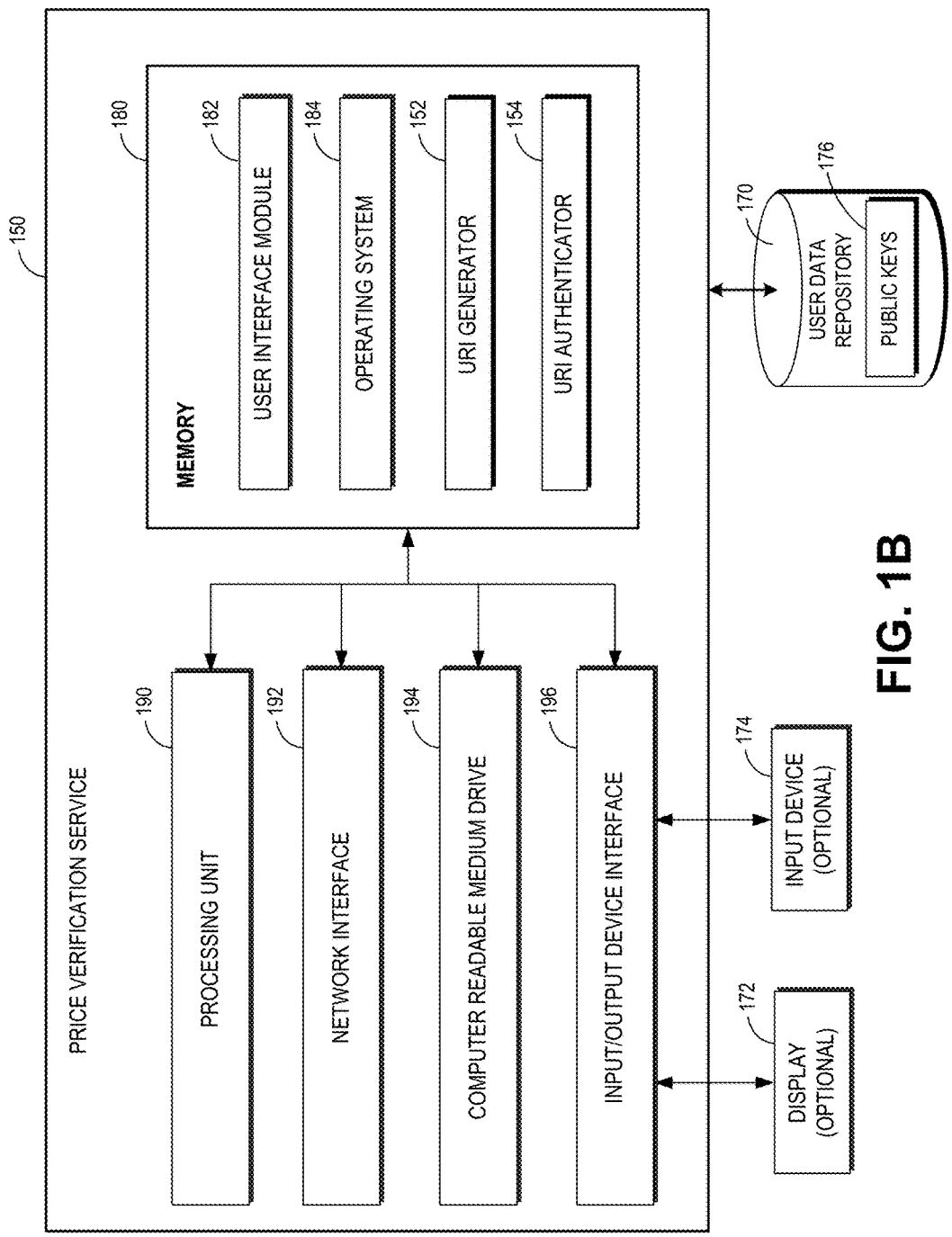
FIG. 1B depicts a general architecture of a computing device providing a price verification service for determining the authenticity of price information embedded in a uniform resource identifier.

FIG. 1B depicts a general architecture of a computing system (referenced as price verification service 150) that processes and verifies information embedded in a uniform resource identifier ("URI"). The general architecture of the price verification service 150 depicted in FIG. 1B includes an arrangement of computer hardware and software modules that may be used to implement aspects of the present disclosure. The price verification service 150 may include many more (or fewer) elements than those shown in FIG. 1B. It is not necessary, however, that all of these generally conventional elements be shown in order to provide an enabling disclosure. As illustrated, the price verification service 150 includes a processing unit 190, a network interface 192, a computer readable medium drive 194, an input/output device interface 196, a display 172, and an input device 174, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display 172 via the input/output device interface 196. The input/output device interface 196 may also accept input from the optional input device 174, such as a keyboard, mouse, digital pen, microphone, touch screen, gesture recognition system, voice recognition system, accelerometer, gyroscope, camera, etc.

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the price verification service 150. The memory 180 may further include computer program instructions and other information for implementing aspects of the present disclosure. For example, in one embodiment, the memory 180 includes a user interface module 182 that generates user interfaces (and/or instructions therefor) for display upon a computing device, e.g., via a navigation and/or browsing interface such as a browser or application installed on the computing device. In addition, memory 180 may include or communicate with a user data repository 170 and/or one or more other data stores, as discussed above with reference to FIG. 1A.

In addition to and/or in combination with the user interface module 182, the memory 180 may include a URI generator 152 and a URI authenticator 154 that may be executed by the processing unit 190. In one embodiment, the user interface module 182, URI generator 152, and URI authenticator 154 individually or collectively implement various aspects of the present disclosure, e.g., generating a URI, verifying the information embedded in the URI, generating a user interface based on the information embedded in the URI, etc., as described further below.

While the URI generator 152 and the URI authenticator 154 are shown in FIG. 1B as part of the price verification service 150, in other embodiments, all or a portion of a URI generator and/or a URI authenticator may be implemented by other components of the electronic marketplace system 100 and/or another computing device. For example, in certain embodiments of the present disclosure, another computing device in communication with the electronic marketplace system 100 may include several modules or components that operate similarly to the modules and components illustrated as part of the price verification service 150. It will also be appreciated that, in some embodiments, a user device may implement functionality that is otherwise described herein as being implemented by the elements and/or modules of the price verification service 150. For example, the user computing device 102 may receive code modules or other instructions from the price verification service 150 and/or other components of the electronic marketplace system 100 via the network 104 that are executed by the user computing device 102 to implement various aspects of the present disclosure.

Figure 2:
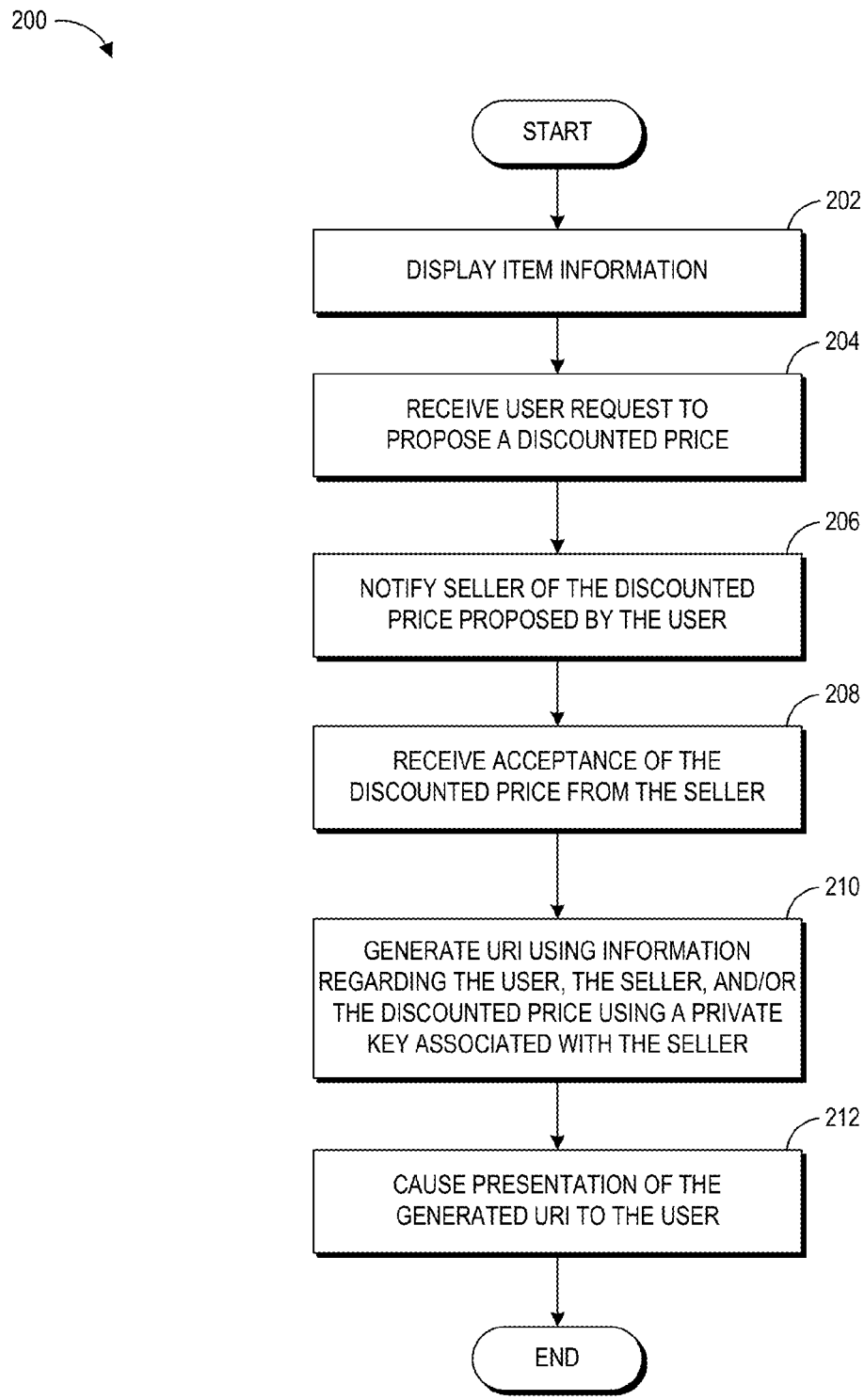
FIG. 2 is a flow diagram of an illustrative method implemented at least in part by a price verification service for generating a uniform resource identifier having price information embedded therein.

FIG. 2 is a flow diagram of an illustrative method 200 implemented at least in part by the price verification service 150 for generating a URI used to facilitate a transaction between two or more parties (e.g., a seller and a buyer). While the illustrative method will be described below as being implemented by one or more components of the marketplace system 100 (e.g., the electronic catalog service 140 and the price verification service 150), in other embodiments, a similar method may be implemented by another computing system not shown in FIG. 1A.

At block 202 of the illustrative method 200, the electronic catalog service 140 displays information associated with an item to a user. For example, the user may be accessing the marketplace system 100 via a user computing system 102, and may have arrived at the item detail page of a particular item of interest. The item detail page may display various information associated with the particular item in a user interface via a browser or other application software installed on the user computing system 102. The item detail page or an associated user interface may include a selectable option that enables the user to request a discounted user-specific price for the item from the seller of the item. An example user interface illustrating such an item detail page is discussed below with reference to FIG. 4.

Next, at block 204, the URI generator 152 of the price verification service 150 receives a user request to propose a discounted price for the item. For example, such a user request may be sent (e.g., by the electronic catalog service 140) to the price verification service 150 after the user selects an option on the item detail page to submit a discounted price request. The price verification service 150 may process the user request by requesting additional information such as a discounted price, a desired quantity, a desired purchase-by date, or the like via a page or a user interface. In another example, another component such as the electronic catalog service 140 may forward such a user request to the price verification service 150 along with the additional details (e.g., a discounted price, a desired quantity, a desired purchase-by date, and/or other information regarding the purchase) specified by the user via a page or a user interface.

At block 206, the price verification service 150 notifies the seller of the item that a potential buyer has proposed a discounted price for the item. For example, the price verification service 150 may generate and send an automated email to the email address of the seller of the item. Such an email may include one or more selectable options for accepting, declining, proposing additional terms or restrictions, and/or modifying the terms (e.g., price, quantity, date, and/or other details regarding the transaction) proposed by the potential buyer. In other embodiments, similar options may be provided in a user interface presented to the seller when the seller accesses the seller's account associated with the electronic marketplace system 100. In other embodiments, the seller may have previously provided information to the electronic marketplace system 100 regarding terms that should be automatically accepted without the seller being contacted, in which case blocks 206 and 208 may be optional.

At block 208, the price verification service 150 receives an acceptance of the discounted price from the seller of the item. For example, when the seller selects an option for accepting the potential buyer's proposed terms, a notification may be sent to the price verification service 150. In some embodiments, the block 208 may be omitted if the block 210 (e.g., generation of a URI including information regarding the transaction) is to be performed in a computing system outside the marketplace system 100 (e.g., seller's computing system).

At block 210, the price verification service 150 generates a URI using the information regarding the transaction between the user (e.g., the buyer) and the seller using a private key (e.g., a private key associated with the seller). In some embodiments, the information includes the price (e.g., discounted price proposed by the buyer and accepted by the seller), item ID, start date (e.g., date/time when the offer becomes valid), end date (e.g., date/time when the offer expires), buyer/customer ID (e.g., ID associated with the user), quantity (e.g., minimum and/or maximum quantity for which the price is valid), discount type (e.g., fixed price, discount in dollars, discount percentage, etc.), discount amount (e.g., 10% off, $25 off, etc.), and/or seller ID (e.g., ID associated with the seller/vendor who accepted the terms proposed by the user/buyer). In some embodiments, the URI includes a checksum of at least a portion of the information included in the URI. For example, the URI may include a checksum of the discounted price and the buyer ID. In another example, the URI may include a checksum of the discounted price, the buyer ID, and the expiration date. In yet another example, the URI includes a checksum of all data included in the URI. Thus, the URI may include a checksum of any combination of the information relating to the transaction. The checksum may further be encrypted using a private key (e.g., a private key associated with the seller). In some implementations, sellers may use their private keys to encrypt one or more parameters relating to the transaction. A private key has a corresponding public key, and sellers may provide their public keys to the facilitator system, so that the facilitator system can decrypt, using the public keys, any information encrypted by the sellers using the corresponding private keys. For example, a seller may encrypt a checksum of (1) the item ID, (2) the discounted price, and (3) the ID of the buyer authorized to purchase the item associated with the item ID at the discounted price. The encrypted checksum may be embedded in the URI along with other parameters such as the item ID, discounted price, buyer ID, etc., and the URI may be provided to the buyer. When the buyer accesses the URI, the facilitator system (e.g., price verification service 150) may determine whether the URI is authentic using the public key associated with the seller, as described in greater detail below with reference to FIG. 3. In some embodiments, the seller provides a private key to the facilitator system, and the facilitator system generates the URI on behalf of the seller. The seller may then provide the generated URI to the buyer. In such embodiments, the facilitator system may store the private key in association with the seller (e.g., in the user data repository 170 of FIG. 1A).

In some embodiments, the price verification service 150 may provide a user interface to the seller for generating a URI to be used (e.g., by a potential buyer) to complete the transaction. The user interface may enable the seller to enter a private key to be used to encrypt the information embedded in the URI. For example, one or more parameters (e.g., discounted price, duration of the offer, minimum/maximum quantity, etc.) may be encrypted before being embedded in the URI so as to keep certain information secret and/or to discourage or prevent manipulation of the parameters. The public key associated with the private key may be provided to the price verification service 150 or another component in the marketplace system 100. The public key may be stored in association with the seller so that the price verification service 150 can use the public key associated with the seller to decrypt the URI or a portion thereof when, for example, a request for a user interface associated with the URI is received.

At block 212, the price verification service 150 causes presentation of the generated URI to the user or otherwise provides the generated URI to the user. This may involve displaying the URI via the browser or other application software executing on the user computing device 102, or emailing the URI to the user's email address. In some embodiments, a system associated with the seller may generate the URI without the help of the price verification service 150 and send the generated URI directly to the user/buyer. For example, a system operated by the seller may include a URI generated for a potential buyer in a custom price sheet, marketing materials, or other document(s) provided to the buyer. In some embodiments, the seller may use the user interface provided by the price verification service 150 to generate a URI, and the seller may provide the generated URI to the user/buyer via email, in a physical document, or any other communication methods. An example URI is discussed below with reference to FIG. 5.

While FIG. 2 has been described above with reference to an embodiment in which the URI is generated by the price verification service 150, in other embodiments, all or a portion of the URI generation may be performed by one of user computing devices 102 (such as a computing device operated by a seller) or another computing device not shown in FIG. 1A. For example, executable code for generating the URI may be provided to a seller, who can then use the code to generate customized URIs for one or more of its customers. Such customized URIs may be sent directly to the buyers without the help of the marketplace system 100. Thus, in some embodiments, the URI generation process is performed entirely outside the marketplace system 100. In other embodiments, the URI generation process is performed partially by the marketplace system 100 and partially by one or more computing systems of the parties to the transaction.

Further, while FIG. 2 has been described above with reference to a user initiating the discounted price approval process, the techniques described herein may be extended to scenarios in which, instead of the user or buyer, the seller initiates the discounted price approval process. In such scenarios, the seller may provide a list of one or more items for which the seller wishes to offer discounted pricing, and the buyer may select from the list of items in which the buyer is interested.

Figure 3:
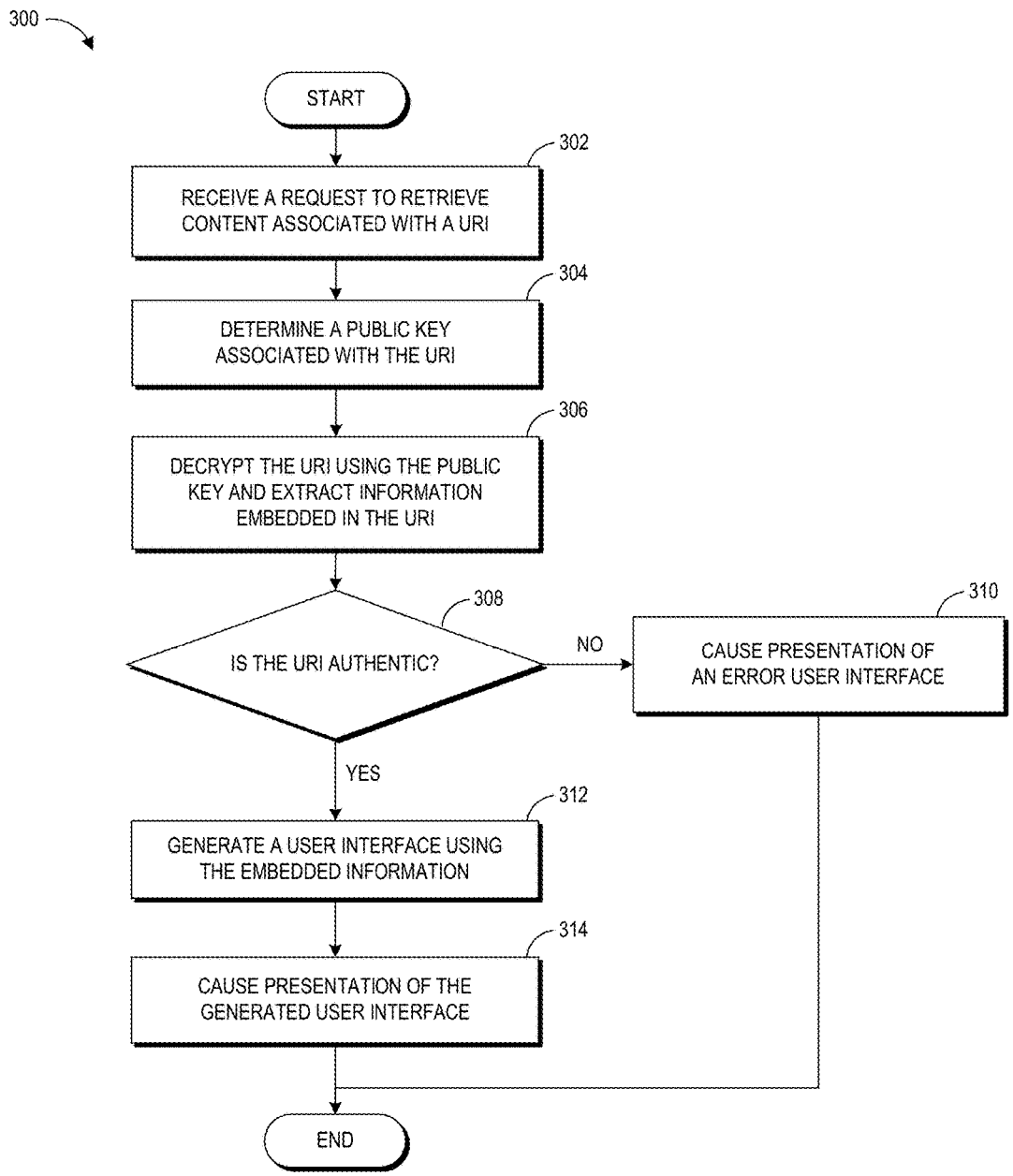
FIG. 3 is a flow diagram of an illustrative method implemented at least in part by a price verification service for verifying the authenticity of a uniform resource identifier.

FIG. 3 is a flow diagram of an illustrative method 300 implemented at least in part by the price verification service 150 for verifying the information embedded in a URI used to facilitate a transaction between two or more parties (e.g., a seller and a buyer). While the illustrative method will be described below as being implemented by the price verification service 150, in other embodiments, a similar method may be implemented by other components of the marketplace system 100 or another computing system not shown in FIG. 1A.

At block 302 of the illustrative method 300, the price verification service 150 receives a request to retrieve content associated with a URI accessed by a user. For example, the URI may be a URI provided to the user by the seller or the marketplace system 100 (e.g., the price verification service 150). Generally, the URI may be received as a result of a browser or other application executing on a user computing device requesting to retrieve content associated with the URI.

At block 304, the URI authenticator 154 of the price verification service 150 determines the public key associated with the URI, for example, using the information included in the URI. In some embodiments, the URI includes a key parameter which indicates the ID associated with the public key. The URI authenticator 154 may retrieve the public key associated with the provided ID from a database for maintaining the public keys (e.g., user data repository 170 of FIG. 1A). In some embodiments, the URI includes a seller ID, which can be used by the URI authenticator 154 to determine the public key associated with the seller having the provided seller ID. In other embodiments, the URI authenticator 154 first determines the seller ID associated with the item ID provided in the URI, and then determines the public key associated with the seller ID.

At block 306, the URI authenticator 154 decrypts the URI (or a portion thereof) using the public key determined at block 304 and extracts information embedded in the URI. In one example, the URI may include a price parameter having a value of "5bS" and a signature parameter having a value of "BMsbPQKkdJryZGVXkdr2." In this example, the URI authenticator 154 may decrypt "5bS" and "BMsbPQKkdJryZGVXkdr2" using the public key determined at block 304. For example, the decrypted values may be "29.95" and "0100101110111010" which correspond, respectively, to the discounted price and the checksum of one or more parameters (e.g., discounted price, seller ID, buyer ID, item ID, minimum quantity, start date, and/or end date) of the transaction. In another example, the price parameter is not encrypted and is instead provided in plain text (e.g., "29.95"). In such an example, the price parameter need not be decrypted and only the checksum may be decrypted.

At block 308, the URI authenticator 154 determines whether the URI is authentic. In some embodiments, an authentic URI may be a URI that was generated by an authorized system (such as the electronic marketplace system or a seller system, depending on the embodiment) and which has not been modified subsequently. In one embodiment, the URI authenticator 154 calculates a checksum of the one or more parameters of the transaction and checks whether the calculated checksum matches the decrypted checksum extracted from the URI. If the checksum values match, the URI authenticator 154 may determine that the URI is authentic, and if the checksum values do not match, the URI authenticator 154 may determine that the URI is not authentic. In some embodiments, in addition to or in lieu of comparing the checksums, the URI authenticator 154 further compares the information embedded in the URI to the information associated with the item and/or the user. For example, the URI authenticator 154 may compare the buyer ID included in the URI to the ID of the user accessing the URI. In another example, the URI authenticator 154 may compare the seller ID included in the URI to the seller ID associated with the item ID. In another example, the URI authenticator 154 may determine whether the current time is within the window of time (e.g., specified by start date/time and end date/time parameters included in the URI) during which the discounted price is valid. If there is any mismatch of information, the URI authenticator 154 may determine that the URI is not authentic. In yet another example, the URI authenticator 154 may determine whether the URI has been used more than a threshold number of times. In such an example, the URI may indicate the number of times that the discounted price may be used before it expires. For example, the URI may indicate that the discounted price is valid for 5 purchases, and if the URI authenticator 154 determines that the URI has already been used 5 times prior to the current activation of the URI (e.g., by referring to a counter or a system that monitors the use of the various URIs), the URI authenticator 154 may determine that the URI is not authentic (or valid).

If the URI authenticator 154 determines that the URI is not authentic, the illustrative method 300 proceeds to block 310, where the price verification service may cause presentation of an error user interface to the user who provided the URI. For example, the URI authenticator 154 may cause an error page indicating that the URI is invalid to be displayed on the user computing device 102 of the user via the browser or other software application executing on the user computing device 102. On the other hand, if the URI authenticator 154 determines that the URI is authentic, the illustrative method 300 proceeds to block 312.

At block 312, the URI authenticator 154 generates a user interface using the information embedded in the URI, then causes presentation of the generated user interface to the user at block 314. As described above, some of the information used to generate the user interface may be derived using the information included in the URI. For example, the price to be displayed in the user interface may be dynamically determined at the time of presentation based at least in part on the discount type and discount amount parameters included in the URI. Accordingly, in some embodiments, some information in the URI may be used to validate or authenticate the URI and/or the discounted price offer (such as buyer ID, expiration date, and/or others), while other information in the URI may be used to dynamically determine information to include within certain fields or portions of an item detail page or other user interface generated in response to the URI request (such as the user-specific price, a minimum or maximum allowed quantity, and/or others). An example user interface generated dynamically based on an authenticated URI is described below with reference to FIG. 6.

While FIG. 3 has been described above with reference to an embodiment in which the URI is verified and the user interface is generated by the price verification service 150, in other embodiments, all or a portion of the URI authentication and user interface generation may be performed by other components of the marketplace system 100, the user computing device 102, and/or another computing device not shown in FIG. 1A. For example, the price verification service 150 may provide the details of the transaction to the electronic catalog service 140, and the electronic catalog service 140 may then generate a user interface to be displayed to the user. Thus, in some embodiments, the URI authentication process and user interface generation process are performed at least partially by components other than the price verification service 150.

Further, while FIG. 3 has been described above with reference to blocks 302-314, the embodiments described herein are not limited as such, and one or more blocks may be added, omitted, modified, or switched without departing from the spirit of the present disclosure. For example, the illustrative method 300 may further include block 316, where the electronic market system 100 facilitates the completion of the transaction between the user and the seller (e.g., allow the user to purchase the item at the discounted price and forward the payment equal to the discounted price to the seller). Similarly, while FIG. 3 has been described above with reference to a user interface that is generated based on the information embedded in the URI, the techniques described herein may be extended to scenarios in which, instead of a human buyer, one or more machines or services provide the URI to the price verification service 150 to complete a transaction. In such scenarios, the price verification service 150 may, instead of generating a user interface in block 312, generate a response that may be processed or stored by the one or more machines or services.

Figure 4:
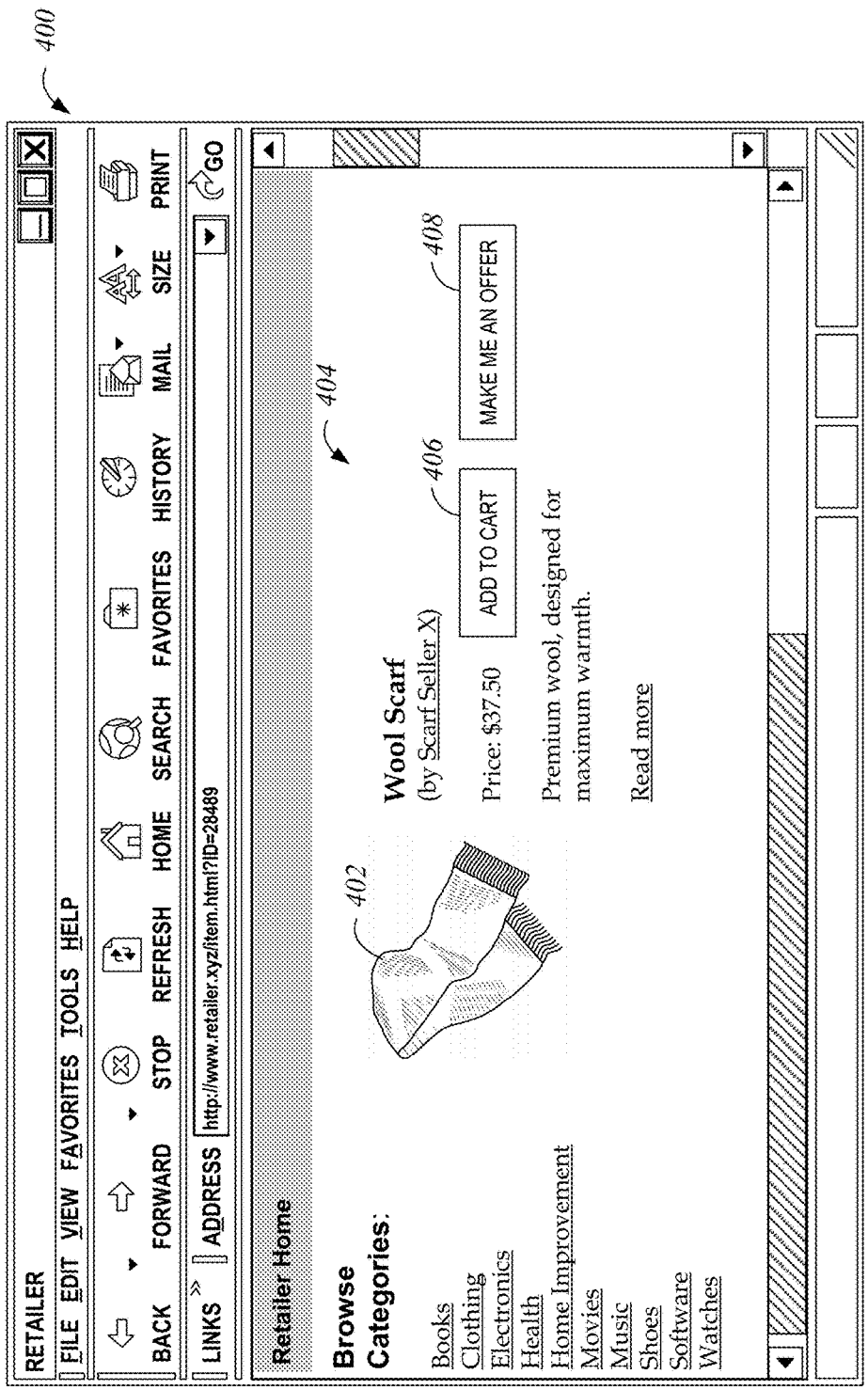
FIG. 4 is an illustrative user interface with which a user may interact to view information regarding an item in an electronic catalog.

FIG. 4 illustrates an example user interface 400 displaying information regarding an item. The example user interface 400 includes an image 402 of the item along with the title of the item ("Wool Scarf"), the seller of the item ("Scarf Seller X"), the current price of the item ("$37.50"), and the description of the item ("Premium wool, designed for maximum warmth."). Further, the example user interface 400 includes a selectable option 406 for adding the item to the shopping cart. If the user wishes to purchase the item at the standard price, the user can add the item to the shopping cart and proceed to checkout. The example user interface 400 also includes a selectable option 408 for making an offer to purchase the item at a price lower than the price that is currently shown (e.g., lower than "$37.50"). Upon selection of the selectable option 408, another user interface for specifying a discounted price may be displayed to the user (not illustrated). Such a user interface may enable the user to further specify a desired quantity, a desired purchase-by date, and/or other types of information determined or requested by the electronic marketplace system and/or the specific seller of the item. While FIG. 4 illustrates an example in which a buyer requests a discounted price for a single item, in other embodiments, the buyer may provide the seller with a list of items on which the buyer is seeking discounted prices. In such embodiments, the seller may provide the buyer with a list of discounted prices and/or URIs in response to receiving the list provided by the buyer. The buyer may subsequently accept one or more of the discounted prices, and proceed to complete the transaction, for example, via the electronic marketplace system 100.

Figure 5:
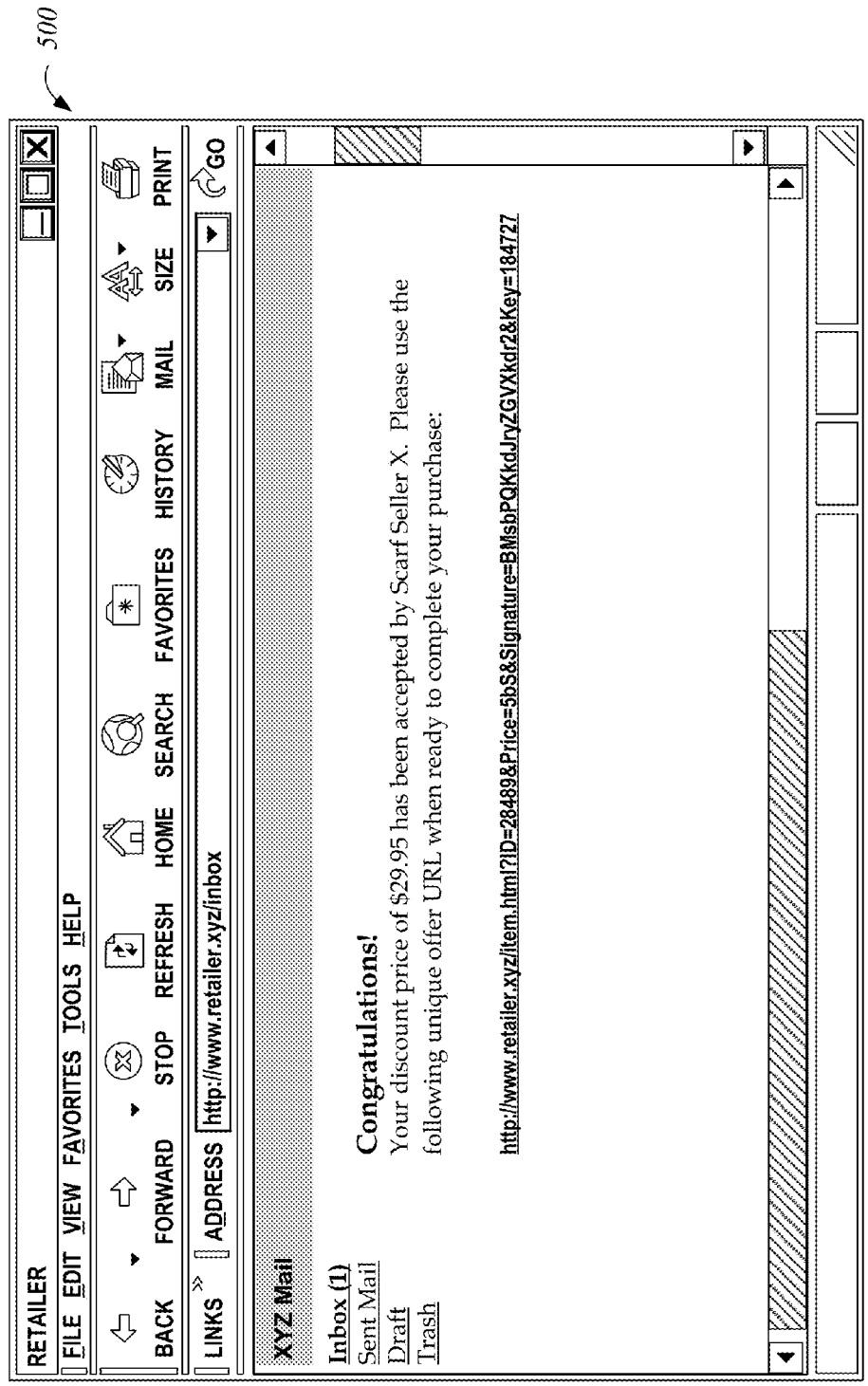
FIG. 5 is an illustrative user interface with which a user may interact to view and access resource identifiers.

FIG. 5 illustrates an example user interface 500 for displaying a URI to a user, who may be a potential buyer of an item at a previously agreed upon discounted price. In the example of FIG. 5, the URI provided to the user reads, "http://www.retailer.xyz/item.html?ID=28489&Price= 5bS&Signature=BMsbPQKkdJryZGVXkdr2&Key= 184727." In this example, "28489" indicates the item ID associated with the item, "5bS" indicates the price encrypted using the public key of the seller, "BMsbPQKkdJ-ryZGVXkdr2" indicates a code generated based on one or more terms of the transaction and encrypted using the public key of the seller, and "184727" indicates the ID associated with the public key of the seller. In some embodiments, the ID of the public key of the seller may be derived from the seller ID associated with the item. In some embodiments, the price is not encrypted, and the raw value (e.g., $29.95) is included in the URI. As discussed above, in other embodiments, alternatively, a discount type and a discount amount may be included in the URI. As illustrated in FIG. 5, the user may proceed to complete the transaction (e.g., the purchase of the item) by selecting the displayed URI or otherwise requesting content associated with the URI using a browser or other application. For example, a request to retrieve content associated with the URI may be provided to the price verification service 150 after the user activates the URI provided in the email.

Figure 6:
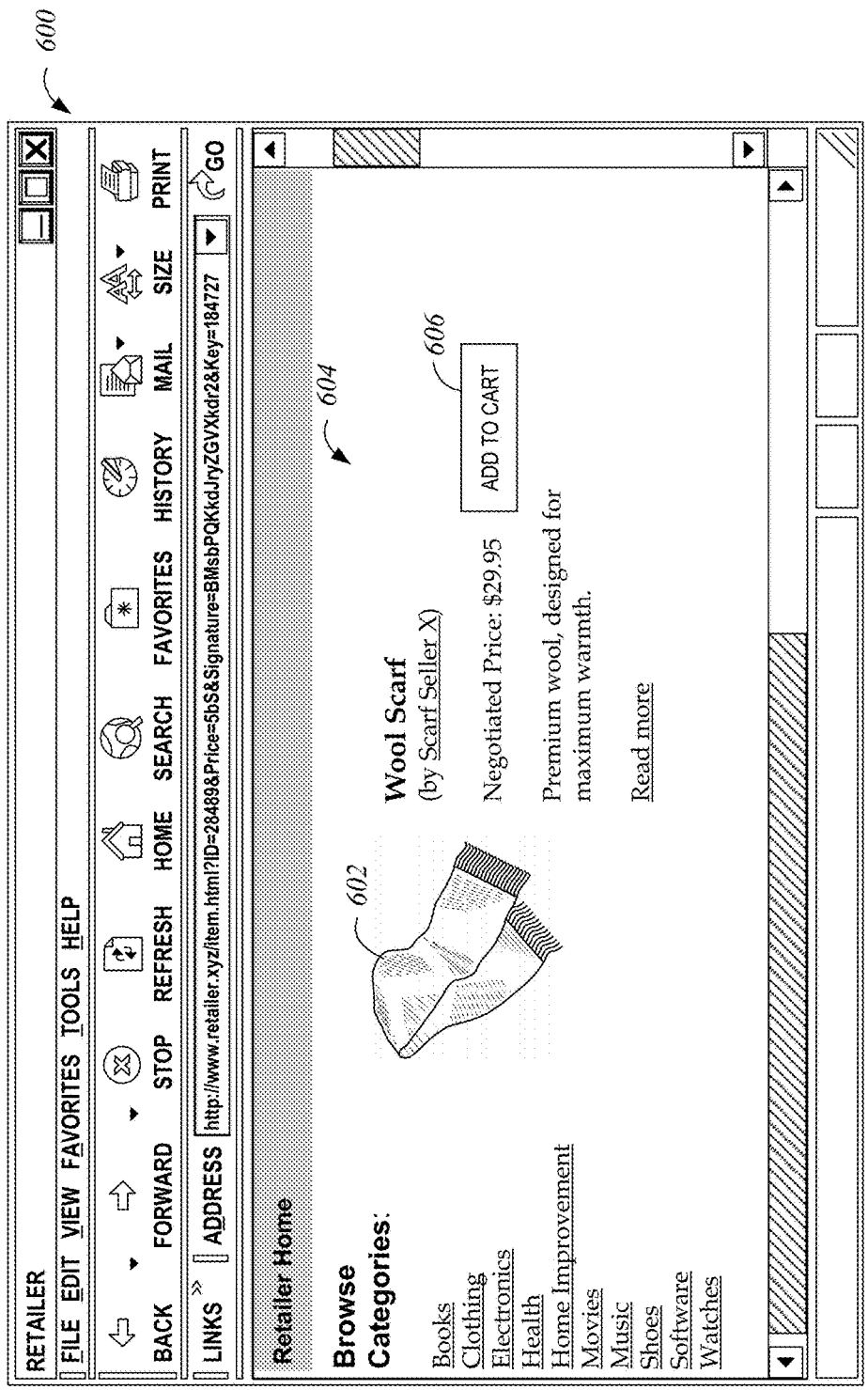
FIG. 6 is an illustrative user interface with which a user may interact to view an item at a discounted price based at least in part on a request for a specific uniform resource identifier.

FIG. 6 shows an example user interface 600 that may be generated at least in part based on determinations made by the URI authenticator 154. The example user interface 600 includes elements similar to those illustrated in the example user interface 400. However, in the example user interface 600, the price displayed to the user reflects the discounted price (e.g., "negotiated price" of $29.95) proposed by the buyer and approved by the seller, instead of the original price (e.g., $37.50) shown in FIG. 4. Further, the example user interface 600 does not include an option for proposing a lower price to the seller of the item (e.g., option 408 of FIG. 4). In some embodiments, the minimum quantity to be purchased by the user is embedded in the URI, and the generated user interface is configured such that the user cannot specify a quantity lower than the minimum quantity. As will be appreciated, some portions of the user interface 600 (such as item image 602 and item name "Wool Scarf") may be retrieved from one or more data stores when generating the user interface (such as based on an item identifier embedded in the URI), while other portions (such as price) may be automatically determined from the authenticated URI without the content or values of those portions previously being stored in any data store accessible to the electronic marketplace system 100.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for verifying authenticity of information in a uniform resource identifier, the system comprising:
   an electronic data store configured to store at least item information associated with a plurality of items; and
   a computing system comprising one or more hardware computing devices executing specific computer-executable instructions, said computing system in communication with the electronic data store, and configured to at least:
      cause presentation of a user interface that includes item information associated with an item of the plurality of items, wherein the presented item information comprises an item price and a seller identifier identifying a seller of the item, wherein the user interface includes a selectable option to request to purchase the item from the seller at a discount price;
      receive an indication of a user selection of the selectable option to request to purchase the item from the seller at a discount price, wherein the received indication includes the discount price offered by the user;
      determine that the seller approves the discount price;
      generate a uniform resource identifier based at least in part on transaction information relating to the request to purchase the item by the user and a private key associated with the seller, the generated uniform resource identifier including account information, the discount price, and a signature parameter;
      provide the generated uniform resource identifier to the user; receive, from a user computing device, a request for a user interface associated with the uniform resource identifier;
      in response to receiving the request for the user interface, determine a public key based at least in part on the account information included in the uniform resource identifier;
      extract the signature parameter included in the uniform resource identifier;
      decrypt the extracted signature parameter using the determined public key;
      determine that the uniform resource identifier is authentic based at least in part on the decrypted signature parameter;
      in response to determining that the uniform resource identifier is authentic, dynamically generate a user interface for presentation on the user computing device, wherein the dynamically generated user interface includes at least (i) a first user interface element indicative of the discount price included in the uniform resource identifier, and (ii) a second user interface element that is selectable and configured to, upon selection on the user computing device, initiate purchase of the item at the discount price included in the uniform resource identifier; and
      cause presentation of the generated user interface on the user computing device.

2. The system of claim 1, wherein the decrypted signature parameter at least comprises a first checksum, and the computing system is further configured to determine whether the uniform resource identifier is authentic at least in part by:
   determining a second checksum of one or more parameters associated with the uniform resource identifier; and
   validating an unencrypted portion of the transaction information at least in part by determining whether the second checksum matches the first checksum.

3. The system of claim 1, wherein the computing system is further configured to at least:
   determine a current time at which the request for the user interface associated with the uniform resource identifier is received,
   wherein determining whether the uniform resource identifier is authentic comprises determining whether the current time is within a time period specified by one or more parameters associated with the uniform resource identifier.

4. A system comprising:
   an electronic data store configured to store at least item information associated with a plurality of elements; and
   a computing system comprising one or more hardware computing devices executing specific computer-executable instructions, said computing system in communication with the electronic data store, and configured to at least:
      receive, from a user computing device, a request for an interface associated with a uniform resource identifier, wherein the uniform resource identifier includes at least account information, a transaction parameter, and a signature parameter;

in response to receiving the request for the interface, determine a public key based at least in part on the account information included in the uniform resource identifier;

extract the signature parameter included in the uniform resource identifier;

decrypt the extracted signature parameter using the determined public key;

determine that the uniform resource identifier is authentic based at least in part on the decrypted signature parameter; and in response to determining that the uniform resource identifier is authentic, generate a first user interface for presentation on the user computing device, the generated first user interface including at least (i) a first user interface element indicative of the transaction parameter included in the uniform resource identifier, and (ii) a second user interface element that is selectable and configured to, upon selection on the user computing device, initiate a transaction based at least in part on the transaction parameter included in the uniform resource identifier.

5. The system of claim 4, wherein the decrypted signature parameter at least comprises a first checksum, and the computing system is further configured to determine that the uniform resource identifier is authentic at least in part by:

determining a second checksum of one or more parameters associated with the uniform resource identifier; and determining that the second checksum matches the first checksum.

6. The system of claim 4, wherein the computing system is further configured to at least:

cause presentation of a second user interface for generating the uniform resource identifier to a user;

receive one or more parameters specified by the user;

determine a checksum of the one or more parameters; and generate the uniform resource identifier based at least in part on the one or more parameters and the determined checksum.

7. The system of claim 4, wherein the computing system is further configured to at least:

determine a current time at which the request for the interface is received; and determine that the uniform resource identifier is authentic at least in part by determining that the current time is within a time period specified by the uniform resource identifier.

8. The system of claim 4, wherein the computing system is further configured to at least:

extract the transaction parameter included in the uniform resource identifier;

decrypt the extracted transaction parameter using the determined public key; and generate the first user interface element based at least in part on the decrypted transaction parameter.

9. The system of claim 4, wherein the computing system is further configured to at least:

receive an indication from the user computing device that the second user interface element is activated; and complete a transaction associated with the uniform resource identifier using the transaction parameter.

10. A computer-implemented method comprising: as implemented by one or more computing devices configured with specific executable instructions, receiving, from a user computing device, a request for an interface associated with a uniform resource identifier, wherein the uniform resource identifier includes at least account information, a transaction parameter, and a signature parameter;

in response to receiving the request for the interface, determining a public key based at least in part on the account information included in the uniform resource identifier;

extracting the signature parameter included in the uniform resource identifier;

decrypting the extracted signature parameter using the determined public key;

determining that the uniform resource identifier is authentic based at least in part on the decrypted signature parameter; and in response to determining that the uniform resource identifier is authentic, generating a first user interface for presentation on the user computing device, the generated first user interface including at least (i) a first user interface element indicative of the transaction parameter included in the uniform resource identifier, and (ii) a second user interface element that is selectable and configured to, upon selection on the user computing device, initiate a transaction based at least in part on the transaction parameter included in the uniform resource identifier.

11. The computer-implemented method of claim 10, further comprising:

determining a first checksum based at least in part on the decrypted signature parameter;

determining a second checksum based on one or more parameters related to the uniform resource identifier; and determining that the uniform resource identifier is authentic at least by determining that the second checksum matches the first checksum.

12. The computer-implemented method of claim 10, further comprising:

causing presentation of a second user interface for generating the uniform resource identifier to a user;

receiving one or more parameters specified by the user;

determining a checksum of the one or more parameters; and generating the uniform resource identifier based at least in part on the one or more parameters and the determined checksum.

13. The computer-implemented method of claim 10, further comprising:

causing presentation of a second user interface for providing a public key to a user;

receiving one or more public keys; and storing the one or more public keys in association with the user.

14. The computer-implemented method of claim 10, further comprising:

determining a current time at which the request for the interface is received, wherein determining that the uniform resource identifier is authentic at least comprises determining that the current time is within a time period specified by the uniform resource identifier.

15. The computer-implemented method of claim 10, further comprising:

restricting at least one field for specifying a transaction parameter in the generated first user interface based on one or more parameters included in the uniform resource identifier.

16. A computer-readable, non-transitory storage medium storing computer executable instructions that, when executed by one or more computing devices, configure the one or more computing devices to perform operations comprising:
receiving, from a user computing device, an indication of selection of a uniform resource identifier by a user, wherein the uniform resource identifier includes at least account information, a transaction parameter, and a signature parameter;
determining a public key based at least in part on the account information included in the uniform resource identifier;
extracting the signature parameter included in the uniform resource identifier;
decrypting the extracted signature parameter using the determined public key;
determining that the uniform resource identifier is authentic based at least in part on the decrypted signature parameter;
in response to determining that the uniform resource identifier is authentic, generating a first user interface for presentation on the user computing device, the generated first user interface including at least (i) a first user interface element indicative of the transaction parameter included in the uniform resource identifier, and (ii) a second user interface element that is selectable and configured to, upon selection on the user computing device, initiate a transaction based at least in part on the transaction parameter included in the uniform resource identifier; and causing presentation of the generated first user interface on the user computing device.

17. The computer-readable, non-transitory storage medium of claim 16, wherein the decrypted signature parameter at least comprises a first checksum, and determining that the uniform resource identifier is authentic at least comprises determining a second checksum of one or more parameters associated with the uniform resource identifier and determining that the second checksum matches the first checksum.

18. The computer-readable, non-transitory storage medium of claim 16, further comprising:
determining a current time at which the request for the user interface associated with the uniform resource identifier is received,
wherein determining that the uniform resource identifier is authentic at least comprises determining that the current time is within a time period specified by the uniform resource identifier.

19. The computer-readable, non-transitory storage medium of claim 16, wherein the generated first user interface includes at least one field for specifying an additional transaction parameter, said at least one field being restricted based on one or more parameters included in the uniform resource identifier.

* * * * *